(12) United States Patent
Inagaki et al.

(10) Patent No.: US 6,469,106 B2
(45) Date of Patent: Oct. 22, 2002

(54) PROCESS FOR PRODUCING MODIFIED DIENE POLYMER RUBBER

(75) Inventors: Katsunari Inagaki, Ichihara (JP); Seiichi Mabe, Ichihara (JP); Yoshihiro Nakatsuji, Chiba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/931,770

(22) Filed: Aug. 20, 2001

(65) Prior Publication Data

US 2002/0077429 A1 Jun. 20, 2002

(30) Foreign Application Priority Data

Oct. 27, 2000 (JP) ........................................ 2000-328813
Dec. 25, 2000 (JP) ........................................ 2000-392268

(51) Int. Cl.$^7$ .................................................. C08F 8/32
(52) U.S. Cl. ................. 525/342; 525/332.8; 525/337.9; 525/333.1; 525/333.2; 525/371; 525/379
(58) Field of Search ................................ 525/342, 371, 525/379

(56) References Cited

U.S. PATENT DOCUMENTS 4,565,604 A * 1/1986 Hansson et al. ......... 525/333.1
4,906,704 A * 3/1990 Neugebauer et al. ..... 525/331.7
5,521,255 A * 5/1996 Roy ........................ 525/332.3
5,753,777 A * 5/1998 Bronstert et al. ........... 502/157

FOREIGN PATENT DOCUMENTS

| EP | 0 334 042 B1 | 9/1989 |
| EP | 0 493 364 A2 | 7/1992 |
| JP | 60-72907 | 4/1985 |
| JP | 2540901 | 7/1996 |
| JP | 2546280 | 8/1996 |

* cited by examiner

*Primary Examiner*—Bernard Lipman
(74) *Attorney, Agent, or Firm*—Sughrue Mion, PLLC

(57) ABSTRACT

There is provided a process for producing a modified diene polymer rubber, which comprises the steps of:

(i) polymerizing a conjugated diene compound, or a combination of a conjugated diene compound and an aromatic vinyl compound in a hydrocarbon solvent in the presence of an alkali metal catalyst, thereby obtaining an active conjugated diene polymer having an alkali metal at the end thereof, and (ii) reacting the active conjugated diene polymer having an alkali metal at the end thereof with an amine compound represented by the specific formula (1), thereby obtaining the modified diene polymer rubber.

4 Claims, No Drawings

PROCESS FOR PRODUCING MODIFIED DIENE POLYMER RUBBER

FIELD OF THE INVENTION

The present invention relates to a process for producing a modified diene polymer rubber superior in impact resilience and processability. The modified diene polymer rubber is most suitable as a fuel cost saving rubber used for motorcar tires because of its superior impact resilience.

BACKGROUND OF THE INVENTION

A styrene-butadiene copolymer obtained by emulsion polymerization is known as rubber used for motorcar tires. However, said copolymer has a problem that motorcar tires comprising said copolymer are not satisfactory from a viewpoint of fuel cost saving, because the copolymer is insufficient in its impact resilience.

In order to obtain rubber superior in its impact resilience, JP-A60-72907 discloses a process, which comprises copolymerizing butadiene and styrene in a hydrocarbon solvent using an organolithium compound as an initiator, and a Lewis base such as ether as a microstructure controlling agent.

Further, Japanese Patent No. 2540901 proposes a process, which comprises reacting an alkali metal, which is bound at the end of a diene polymer rubber, with a specific acrylamide to obtain a modified diene polymer rubber having improved impact resilience.

Furthermore, Japanese Patent Application No. 2000-328813 discloses a process, which comprises reacting an alkali metal, which is bound at the end of a diene polymer rubber, with a specific amine to obtain a modified diene polymer rubber having improved impact resilience and processability.

However, recently, a level of a demand for fuel cost saving of motorcar tires, and for processability of rubber is high, and therefore, any of the above-mentioned copolymer rubbers can hardly meet such a demand.

SUMMARY OF THE INVENTION

An object of the present invention is to provide a process for producing a modified diene polymer rubber superior in impact resilience and processability.

The present invention provides a process for producing a modified diene polymer rubber, which comprises the steps of:

(i) polymerizing a conjugated diene compound, or a combination of a conjugated diene compound and an aromatic vinyl compound in a hydrocarbon solvent in the presence of an alkali metal catalyst, thereby obtaining an active conjugated diene polymer having an alkali metal at the end thereof; and (ii) reacting the active conjugated diene polymer having an alkali metal at the end thereof with an amine compound represented by the following formula (1), thereby obtaining the modified diene polymer rubber,

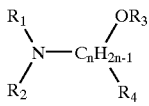

wherein each of $R_1$, $R_2$ and $R_3$ is an alkyl group having 1 to 8 carbon atoms, $R_4$ is an alkoxy or alkyl group having 1 to 8 carbon atoms, and n is an integer of 1 to 8.

The present invention also provides a process for producing a modified diene polymer rubber, which comprises the steps of:

(i) polymerizing a conjugated diene compound, or a combination of a conjugated diene compound and an aromatic vinyl compound in a hydrocarbon solvent in the presence of an alkali metal catalyst, thereby obtaining an active conjugated diene polymer having an alkali metal at the end thereof; and (ii) reacting the active conjugated diene polymer having an alkali metal at the end thereof with an amine compound represented by the above formula (1) and a silicon or tin compound represented by the following formula (2), thereby obtaining the modified diene polymer rubber, $$R_a MX_b \quad (2)$$

wherein R is an alkyl, alkenyl, cycloalkenyl or aromatic hydrocarbon group, M is a silicon or tin atom, X is a halogen atom, a is an integer of 0 to 2, and b is an integer of 2 to 4.

The modified diene polymer rubber obtained in the above-mentioned latter invention is further superior in processability to that obtained in the above-mentioned former invention.

DETAILED DESCRIPTION OF THE PREFERRED EMBODIMENTS

Examples of a conjugated diene compound used in the present invention are 1,3-butadiene, isoprene, 1,3-pentadiene (piperylene), 2,3-dimethyl-1,3-butadiene and 1,3-hexadiene. Of these, 1,3-butadiene and isoprene are preferred from a viewpoint of availability and physical properties of a modified diene polymer rubber obtained.

Examples of an aromatic vinyl compound used in the present invention are styrene, α-methylstyrene, vinyltoluene, vinylnaphthalene, divinylbenzene, trivinylbenzene and divinylnaphthalene. Of these, styrene is preferred from a viewpoint of availability and physical properties of a modified diene polymer rubber obtained.

A hydrocarbon solvent used in the present invention comprises those solvents, which do not deactivate an alkali metal catalyst. Examples of the hydrocarbon solvent are aliphatic hydrocarbons, aromatic hydrocarbons and alicyclic hydrocarbons. Specific examples thereof are those having 2 to 12 carbon atoms such as propane, n-butane, iso-butane, n-pentane, iso-pentane, n-hexane, cyclohexane, propene, 1-butene, iso-butene, trans-2-butene, cis-2-butene, 1-pentene, 2-pentene, 1-hexene, 2-hexene, benzene, toluene, xylene and ethylbenzene. These solvents can be used in a mixture of two or more.

Examples of the alkali metal catalyst used in the present invention are metals such as lithium, sodium, potassium, rubidium and cesium: hydrocarbon compounds containing these metals; and complexes of these metals and polar compounds.

Preferred alkali metal catalysts are lithium or sodium compounds having 2 to 20 carbon atoms. Specific examples thereof are ethyllithium, n-propyllithium, iso-propyllithium, n-butyllithium, sec-butyllithium, t-octyllithium, n-decyllithium, phenyllithium, 2-naphthyllithium, 2-butyl-phenyllithium, 4-phenyl-butyllithium, cyclohexyllithium, 4-cyclopentyllithium, 1, 4-dilithio -butene-2, sodium naphthalene, sodium biphenyl, potassium-tetrahydrofuran complex, potassium-diethoxyethane complex and sodium salt of α-methylstyrene tetramer.

Among amine compounds represented by the above formula (1) used in the present invention, preferred are those having methyl groups as $R_1$ and $R_2$, a methyl, ethyl, propyl or butyl group as R3, a methoxy, ethoxy, propoxy or butoxy group as $R_4$, and 1 as n.

Specific examples of the amine compounds are 1, 1-dimethoxytrimethylamine, 1, 1-diethoxytrimethylamine, 1, 1-di-n-propoxytrimethylamine, 1, 1-di-iso-propoxytrimethylamine, 1, 1-di-n-butoxytrimethylamine, 1, 1-di-tert-butoxytrimethylamine, 1, 1-diethoxytriethylamine, 1, 1-di-n-propoxytriethylamine, 1, 1-di-iso-propoxytriethylamine, 1, 1-di-n-butoxytriethylamine and 1, 1-di-tert-butoxytriethylamine. of these, a low molecular weight amine such as 1, 1-dimethoxytrimethylamine is preferred, from a viewpoint that the object of the present invention can be accomplished by using a small amount thereof.

When a combination of the conjugated diene compound and the aromatic vinyl monomer is used, a weight ratio of conjugated diene compound/aromatic vinyl monomer is preferably from 50/50 to 90/10, and more preferably from 55/45 to 85/15. When the ratio is less than 50/50, the modified diene polymer rubber obtained may be insoluble in the hydrocarbon solvent, and as a result, it may be impossible to continue a homogeneous polymerization. When the ratio exceeds 90/10, strength of the modified diene polymer rubber obtained may decrease.

In carrying out the polymerization in the above-mentioned step (i), it is permitted to use a known randomizer or a compound capable of controlling a vinyl bond content in the modified diene polymer rubber obtained. Here, the "vinyl bond" means a vinyl bond present in a structure unit derived from the conjugated diene monomer, which unit is hereinafter referred to as "conjugated diene monomer unity".

A preferred compound capable of controlling the vinyl bond content contains available Lewis base compounds such as ethers and tertiary amines. Examples of the ethers are cyclic ethers such as tetrahydrofuran, tetrahydropyran and 1, 4-dioxane; aliphatic mono ethers such as diethyl ether and dibutyl ether; aliphatic diethers such as ethylene glycol dimethyl ether, ethylene glycol diethyl ether, ethylene glycol dibutyl ether, diethylene glycol diethyl ether and diethylene glycol dibutyl ether; and aromatic ethers such as diphenyl ether and anisole. Examples of the tertiary amines are triethylamine, tripropylamine, tributylamine, N,N,N',N'-tetramethylethylenediamine, N,N-diethylaniline, pyridine and quinoline.

The amine compound represented by the above formula (1) is used in an amount of usually from 0.1 to 10 mol, and preferably from 0.2 to 5 mol per mol of the alkali metal catalyst used in the step (i). When the amount used is less than 0.1 mol, impact resilience of the modified diene polymer rubber obtained may be insufficient. Whereas, when it exceeds 10 mol, a concentration of the amine compound contained in the hydrocarbon solvent (which solvent is used repeatedly) may be too high, and as a result, a step of separating the amine compound from the solvent may be required, which is undesirable from an economical point of view.

The compound represented by the above formula (2) functions as a coupling agent for the active diene polymer rubber. The R group in the formula (2) is an alkyl, alkenyl, cycloalkenyl or aromatic hydrocarbon group. Of these, preferred are those having not more than 8 carbon atoms from a viewpoint of availability, and particularly preferred are methyl, ethyl, vinyl, ethynyl, cyclohexyl, phenyl and benzyl groups.

Examples of the silicon compound represented by the formula (2) are tetrachlorosilane, tetrabromosilane, methyltrichlorosilane, butyltrichlorosilane, dichlorosilane and bistrichlorosylylsilane. Examples of the tin compound are tetrachlorotin, tetrabromotin, methyltrichlorotin, butyltrichlorotin, dichlorotin and bistrichlorosylyltin.

The compound represented by the formula (2) is used in an amount of:
  (a) from 0.03 to 0.4 equivalent in terms of the halogen atom in said compound per equivalent of the alkali metal atom, which is bound at the end of the active diene polymer rubber, or
  (b) usually from 0.03 to 0.4 mol, and preferably from 0.05 to 0.3 mol per mol of the alkali metal catalyst.

When the amount used of the compound represented by the formula (2) is less than 0.03 equivalent or less than 0.03 mol, processability of the modified diene polymer rubber obtained may be unsatisfactory.

When the amount exceeds 0.4 equivalent or 0.4 mol, the amount of the alkali metal to be allowed to react with the amine compound used in the step (ii) may be insufficient, and as a result, impact resilience of the modified diene polymer rubber obtained may be unsatisfactory.

Reaction conditions such as a reaction temperature and a reaction time in the above step (ii are not particularly limited. In general, the reaction temperature is usually from room temperature to 120° C., and the reaction time is from several seconds to several hours. In carrying out the reaction in this step, it is only needed to contact the polymer having an alkali metal at the end thereof with the amine compound represented by the formula (1), or to contact the polymer having an alkali metal at the end thereof with the amine compound represented by the formula (1) and the compound represented by the formula (2). A preferred manner of the contact is to add the amine compound represented by the formula (1) and, if any, the compound represented by the formula (2) to the reaction mixture obtained in the step (i).

How to separate the modified diene polymer rubber from the reaction mixture obtained in the step (ii) is not limited. In carrying out the separation, for example, according to a process commonly employed in a rubber production by solution polymerization, (1) a coagulant is added to the reaction mixture to solidify the modified diene polymer rubber, which is then separated, or (2) steam is introduced into the reaction mixture to solidify the modified diene polymer rubber, which is then separated. A temperature at which the solidification is performed is not limited.

The modified diene polymer rubber separated can be dried with a drier such as a band drier and an extrusion type drier, which are commonly employed in a synthetic rubber production. A drying temperature is not limited.

The modified diene polymer rubber in accordance with the present invention has an amino group or both an amino group and an alkoxy group bound at the end thereof. Mooney viscosity of said modified diene polymer rubber ($ML_{1+4}$) is preferably from 10 to 200, and more preferably from 20 to 150. When the Mooney viscosity is less than 10, mechanical properties such as tensile strength of vulcanized rubber, which can be obtained by vulcanizing said modified diene polymer rubber, may decrease. When the Mooney viscosity exceeds 200, miscibility when blending said modified diene polymer rubber with the other rubber to produce a rubber composition may be so poor that it is difficult to produce said rubber composition, and as a result, mechanical properties of a vulcanized rubber composition, which can be obtained by vulcanizing the rubber composition, may decrease.

A content of the vinyl bond in the modified diene polymer rubber in accordance with the present invention is preferably from 10 to 70%, and more preferably from 15 to 60%. When the content is less than 10%, a glass transition temperature of the modified diene polymer rubber obtained may be lowered to deteriorate a grip performance of motorcar tires composed of the modified diene polymer rubber. When the content exceeds 70%, a glass transition temperature of the modified diene polymer rubber obtained may be elevated to deteriorate the impact resilience of the modified diene polymer rubber.

The modified diene polymer rubber in accordance with the present invention can be used in combination with other components such as the other rubber and various additives.

Examples of the other rubber are styrene-butadiene copolymer rubber obtained by emulsion polymerization; polybutadiene rubber, butadiene-isoprene copolymer rubber and styrene-butadiene copolymer rubber obtained by solution polymerization using catalysts such as an anion polymerization catalyst and a ziegler type catalyst; and natural rubber. Depending upon the purposes, these rubbers may be used in combination of two or more.

As to the rubber composition comprising the other rubber and the modified diene polymer rubber in accordance with the present invention, a proportion of the latter rubber is preferably not less than 10% by weight, and more preferably not less than 20% by weight, based on 100% by weight of a total weight of both rubbers. When the proportion is less than 10% by weight, the impact resilience and processability of the rubber composition obtained may hardly be improved.

The above-mentioned additives can be selected from those usually employed in a rubber industry depending upon purposes of using the rubber composition obtained. Examples of the additives are vulcanizing agents such as sulfur; stearic acid; zinc white; thiazol type vulcanization accelerators: vulcanization accelerators such as thiuram type vulcaniztion accelerators and sulfenamide type vulcanization accelerators; organic peroxides; reinforcing agents such as carbon black of HAF and ISAF grades: fillers such as silica, calcium carbonate and talc; oil for extension; processing auxiliaries; and antioxidants.

How to obtain the above-mentioned rubber composition is not limited. For example, the rubber composition can be obtained by blending the modified diene polymer rubber, the other rubber and the additive with use of a known mixer such as a roll and Bambury mixer. The resulting rubber composition is usually vulcanized, and is used as a vulcanized rubber composition.

Since the modified diene polymer rubber in accordance with the present invention is superior in impact resilience and processability, the rubber composition comprising said rubber is most suitable as a fuel cost saving rubber used for motorcar tires. The rubber composition can be also employed for uses such as the sole of a shoe, floor materials and rubber vibration insulators.

Examples

The present invention is explained with reference to the following Examples, which are not intended to limit the scope of the present invention.

The polymer rubber obtained was measured and evaluated as follows.

(1) Mooney viscosity

It was measured at 100° C. according to JIS K-6300.

(2) Content of vinyl group

It was measured according to infrared spectroscopic analysis.

(3) Content of styrene unit

It was measured according to refractive index method.

(4) Processability

A composition having blending proportions as shown in Table 1 was wound around a 6-inch roll kept at 50° C., and the state of the composition on the roll was rated with evaluation marks based on the criteria as shown in Table 2. The space between the rolls was changed to 0.7 mm, 1.0 mm and 2.0 mm in order.

(5) Impact resilience of vulcanized rubber

Components as shown in Table 1 were kneaded in blending proportions as shown in that Table with a plastomill for laboratory use to obtain a rubber composition. The rubber composition was molded into a sheet like form with a 6-inch roll, followed by heating at 160° C. for 15 minutes, thereby obtaining a vulcanized rubber. Impact resilience at 60° C. of the vulcanized rubber was measured with a Luepke resilience tester.

Example 1

A 20 liter-volume stainless steel polymerization reactor was washed and dried, and thereafter was purged with dry nitrogen. Successively, 1420 g of 1, 3-butadiene, 580 g of styrene, 122 g of tetrahydrofuran, 10.2 kg of hexane and 11.0 mmol of n-butyllithium (n-hexane solution) were charged therein. The resulting mixture was stirred for 3 hours at 65° C., and 11.0 mmol of 1, 1-dimethoxytrimethylamine was added to the reaction mixture, followed by stirring for 30 minutes at 65° C. Successively, 10 ml of methanol was added to the reaction mixture, followed by stirring for 5 minutes at 65° C.

The reaction mixture obtained was taken out, and 10 g of 2, 6-di-t-butyl-p-crezol, a trademark of SUMILIZER BHT, manufactured by Sumitomo Chemical Co., Ltd., was added thereto. Thereafter, most of hexane was evaporated, and successively the residue was vacuum-dried for 12 hours at 55° C., thereby obtaining a modified diene polymer rubber. The results are shown in Table 3.

Comparative Example 1

Example 1 was repeated, except that 1, 1-dimethoxytrimethylamine was replaced by N,N-dimethylaminopropyl acrylamide, thereby obtaining a polymer rubber. The results are shown in Table 3.

Comparative Example 2

Example 1 was repeated, except that no 1, 1-dimethoxytrimethylamine was used, and the amount of n-butyllithium was changed to 11.5 mmol, thereby obtaining a polymer rubber. The results are shown in Table 3.

Example 2

Example 1 was repeated, except that 1, 1-dimethoxytrimethylamine was added in an amount of 33 mmol, thereby obtaining a polymer rubber. The results were as shown in Table 4.

Example 3

Example 1 was repeated, except that 1, 1-dimethoxytrimethylamine was changed to 1, 1-diethoxytrimethylamine, thereby obtaining a polymer rubber. The results are shown in Table 4.

Example 4

Example 1 was repeated, except that 1, 1-dimethoxytrimethylamine was replaced by 1, 1-di-n-propoxytrimethylamine, thereby obtaining a polymer rubber. The results are shown in Table 4.

Example 5

Example 1 was repeated, except that 1, 1-dimethoxytrimethylamine was replaced by 1, 1-di-n-butoxytrimethylamine, thereby obtaining a polymer rubber. The results are shown in Table 4.

Comparative Example 3

Example 1 was repeated, except that no 1, 1-dimethoxytrimethylamine was used, and the amount of n-butyllithium was changed to 9.8 mmol, thereby obtaining a polymer rubber. The results are shown in Table 4.

Comparative Example 4

Example 1 was repeated, except that no 1, 1-dimethoxytrimethylamine was used, and the amount of n-butyllithium was changed to 11.2 mmol, thereby obtaining a polymer rubber. The results are shown in Table 4.

Example 6

Components as shown in Table 5 were kneaded in blending proportions as shown in that Table with a plastomill for laboratory use to obtain a rubber composition. The rubber composition was molded into a sheet like form with a 6-inch roll, followed by heating at 160° C. for 45 minutes, thereby obtaining a vulcanized rubber. Processability when molding the rubber composition into a sheet like form and impact resilience of the vulcanized rubber were measured and evaluated as mentioned above. The results are shown in Table 6.

Comparative Example 5

Example 6 was repeated, except that the polymer rubber was replaced by the polymer rubber obtained in Comparative Example 2. The results are shown in Table 6.

Comparative Example 6

Example 6 was repeated, except that the polymer rubber was replaced by the polymer rubber obtained by repeating Example 1, except that no 1, 1-dimethoxytrimethylamine was used and the amount of n-butyllithium was changed to 9.4 mmol. The results are shown in Table 6.

Example 7

A 20 liter-volume stainless steel polymerization reactor was washed and dried, and thereafter was purged with dry nitrogen. Successively, 1716 g of 1, 3-butadiene, 484 g of styrene, 216 g of tetrahydrofuran, 10.2 kg of hexane and 11.7 mmol of n-butyllithium (n-hexane solution) were charged therein. The resulting mixture was stirred for 3 hours at 65° C., thereafter 0.64 mmol of tetrachlorosilane was added to the reaction mixture, and 15 minutes thereafter, 8.19 mmol of 1, 1-dimethoxytrimethylamine was added thereto, followed by stirring for 30 minutes at 65° C. Then, 10 ml of methanol was added to the reaction mixture, followed by stirring for 5 minutes at 65° C.

The reaction mixture obtained was taken out, and 11 g of 2, 6-di-t-butyl-p-crezol was added thereto. Thereafter, most of hexane was evaporated, and successively the residue was vacuum-dried for 12 hours at 55° C., thereby obtaining a modified diene polymer rubber. The results are shown in Table 7.

Example 8

Example 7 was repeated, except that the amount of n-butyllithium was changed to 12.2 mmol, 0.86 mmol of tetrachlorotin was used in place of tetrachlorosilane, and the amount of 1, 1-dimethoxytrimethylamine was changed to 8.56 mmol, thereby obtaining a polymer rubber. The results are shown in Table 7.

Comparative Example 7

Example 7 was repeated, except that the amount of n-butyllithium was changed to 11.4 mmol, the amount of tetrachlorosilane was changed to 0.68 mmol, and no 1, 1-dimethoxytrimethylamine was used, thereby obtaining a polymer rubber. The results are shown in Table 7.

Comparative Example 8

Example 7 was repeated, except that the amounts of 1, 3-butadiene, styrene, tetrahydrofuran and n-butyllithium were changed to 1420 g, 580 g, 122 g and 9.8 mmol, respectively, neither tetrachlorosilane nor 1, 1-dimethoxytrimethylamine was used, and the amount of 2, 6-di-t-butyl-p-cresol was changed to 10 g, thereby obtaining a polymer rubber. The results are shown in Table 7.

TABLE 1

| Components | Proportion (part by weight) |
| --- | --- |
| Polymer rubber | 100 |
| HAF Carbon black (Note 1) | 45 |
| Antioxidant (Note 2) | 1.5 |
| Zinc white | 3 |
| Stearic acid | 2 |
| Vulcanization accelerator (Note 3) | 1 |

TABLE 1-continued

| Components | Proportion (part by weight) |
| --- | --- |
| Wax (Note 4) | 1.5 |
| Sulfur | 1.75 |

(Note 1): Trade mark of DIABLACK N 339, manufactured by Mitsubishi Chemical Corporation.
(Note 2): Trademark of ANTIGEN 3C, manufactured by Sumitomo Chemical Co., Ltd.
(Note 3): Trademark of SOXINOL CZ, manufactured by Sumitomo Chemical Co., Ltd.
(Note 4): Trade mark of SUNNOC N, manufactured by Ouchishinko Chemical Industrial Co., Ltd.

TABLE 2

| Evaluation marks | State of composition on roll |
| --- | --- |
| 5 | State in which the composition winds round the roll is extremely good, and a sheet having a smooth surface is obtainable. |
| 4 | State in which the composition winds round the roll is good, but a little skin roughness is observed at the edge of a sheet. |
| 3 | The composition winds round the roll, but it tends to cause bagging to some extent. |
| 2 | The composition causes bagging and sheet-cut. |
| 1 | The composition is difficult to engage with the roll, and it is difficult to mold into a sheet like form. |

TABLE 3

|  | Example 1 | Comparative Example 1 | Comparative Example 2 |
| --- | --- | --- | --- |
| Mooney viscosity ($ML_{1+4}$ 100° C.) | 51 | 55 | 53 |

TABLE 3-continued

|  | Example 1 | Comparative Example 1 | Comparative Example 2 |
| --- | --- | --- | --- |
| Vinyl content (wt %) | 42 | 42 | 42 |
| Styrene unit content (wt %) | 29 | 29 | 29 |
| Processability | 4 | 3 | 3 |
| Impact resilience of vulcanized rubber (60° C.) (%) | 68 | 63 | 58 |

TABLE 5

| Components | Proportion (part by weight) |
| --- | --- |
| Polymer rubber (Note 1) | 100 |
| Silica (Note 2) | 78.4 |

TABLE 5-continued

| Components | Proportion (part by weight) |
| --- | --- |
| Silane coupling agent (Note 3) | 6.4 |
| Carbon | 6.4 |
| Extender oil (Note 4) | 47.6 |
| Antioxidant (Note 5) | 1.5 |
| Zinc white | 2 |
| Vulcanization accelerator (Note 6) | 1 |
| Vulcanization accelerator (Note 7) | 1 |
| Wax (Note 8) | 1.5 |
| Sulfur | 1.4 |

(Note 1): Modified diene polymer rubber obtained in Example
(Note 2): Trademark of ULTRASIL VN3-G, manufactured by Degussa.
(Note 3): Si69 manufactured by Deggusa.
(Note 4): Aroma oil, trademark of X-140, manufactured by Kyodo Oil Co., Ltd.
(Note 5): Antioxidant, trademark of ANTIGEN 3C, manufactured by Sumitomo Chemical Co., Ltd.
(Note 6): Vulcanization accelerator, trademark of SOXINOL CZ, manufactured by Sumitomo Chemical Co., Ltd.
(Note 7): Vulcanization accelerator, trademark of SOXINOL D, manufactured by Sumitomo Chemical Co., Ltd.
(Note 8): Trademark of SUNNOC N, manufactured by Ouchishinko Chemical Industrial Co., Ltd.

TABLE 6

|  | Example 6 | Comparative Example 5 | Comparative Example 6 |
| --- | --- | --- | --- |
| Mooney viscosity ($ML_{1+4}$100° C.) | 51 | 55 | 66 |
| Vinyl content (wt %) | 42 | 42 | 42 |
| Styrene unit content (wt %) | 29 | 29 | 29 |
| Processability | 4 | 3 | 2 |
| Impact resilience of vulcanized rubber (60° C.) (%) | 56 | 53 | 51 |

TABLE 4

|  | Example 2 | Example 3 | Example 4 | Example 5 | Comparative Example 3 | Comparative Example 4 |
| --- | --- | --- | --- | --- | --- | --- |
| Mooney viscosity ($ML_{1+4}$ 100° C.) | 66 | 62 | 58 | 62 | 67 | 55 |
| Vinyl content (wt %) | 42 | 42 | 42 | 42 | 42 | 42 |
| Styrene unit content (wt %) | 29 | 29 | 29 | 29 | 29 | 29 |
| Processability | 4 | 4 | 4 | 4 | 3 | 3 |
| Impact resilience of vulcanized rubber (60° C.) | 68 | 66 | 66 | 66 | 62 | 60 |

TABLE 7

|  | Example 7 | Example 8 | Comparative Example 7 | Comparative Example 8 |
| --- | --- | --- | --- | --- |
| Mooney viscosity ($ML_{1+4}$100° C.) | 71 | 70 | 70 | 67 |
| Vinyl content (wt %) | 58 | 56 | 57 | 42 |
| Styrene unit content (wt %) | 22 | 22 | 22 | 29 |
| Processability | 5 | 5 | 4 | 3 |
| Impact resilience of vulcanized rubber (60° C.) (%) | 66 | 64 | 60 | 62 |

What is claimed is:
1. A process for producing a modified diene polymer rubber, which comprises the steps of:

(i) polymerizing a conjugated diene compound, or a combination of a conjugated diene compound and an aromatic vinyl compound in a hydrocarbon solvent in the presence of an alkali metal catalyst, thereby obtaining an active conjugated diene polymer having an alkali metal at the end thereof; and (ii) reacting the active conjugated diene polymer having an alkali metal at the end thereof with an amine compound represented by the following formula (1), thereby obtaining the modified diene polymer rubber,

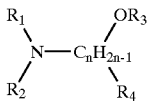
(1)

wherein each of $R_1$, $R_2$ and $R_3$ is an alkyl group having 1 to 8 carbon atoms, $R_4$ is an alkoxy or alkyl group having 1 to 8 carbon atoms, and n is an integer of 1 to 8.

2. The process for producing a modified diene polymer rubber according to claim 1, wherein each of $R_1$ and $R_2$ is a methyl group, $R_3$ is a methyl, ethyl, propyl or butyl group, $R_4$ is a methoxy, ethoxy, propoxy or butoxy group, and n is 1.

3. The process for producing a modified diene polymer rubber, which comprises the steps of:

(i) polymerizing a conjugated diene compound, or a combination of a conjugated diene compound and an aromatic vinyl compound in a hydrocarbon solvent in the presence of an alkali metal catalyst, thereby obtaining an active conjugated diene polymer having an alkali metal at the end thereof; and (ii) reacting the active conjugated diene polymer having an alkali metal at the end thereof with an amine compound represented by the following formula (1) and a silicon or tin compound represented by the following formula (2), thereby obtaining the modified diene polymer rubber,

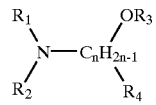
(1)

wherein each of $R_1$, $R_2$ and $R_3$ is an alkyl group having 1 to 8 carbon atoms, $R_4$ is an alkoxy or alkyl group having 1 to 8 carbon atoms, and n is an integer of 1 to 8, and wherein R is an alkyl, alkenyl, cycloalkenyl or aromatic hydrocarbon group, M is a silicon or tin atom, X is a halogen atom, a is an integer of 0 to 2, and b is an integer of 2 to 4.

4. The process for producing a modified diene polymer rubber according to claim 3, wherein each of $R_1$ and $R_2$ is a methyl groups $R_3$ is a methyl, ethyl, propyl or butyl group, $R_4$ is a methoxy, ethoxy, propoxy or butoxy group, and n is 1.

* * * * *